United States Patent [19]

Wissman et al.

[11] Patent Number: 4,932,775
[45] Date of Patent: Jun. 12, 1990

[54] FM LASER TRANSMITTER

[75] Inventors: Charles H. Wissman; Michael T. Braski, both of Carlsbad; Richard A. Tilton, San Diego, all of Calif.

[73] Assignee: Hughes Aircraft Company, Los Angeles, Calif.

[21] Appl. No.: 274,240

[22] Filed: Nov. 21, 1988

[51] Int. Cl.$^5$ .......................... G01C 3/08; H01S 3/10; H01S 3/082
[52] U.S. Cl. ...................... 356/5; 356/28.5; 455/611; 372/28; 372/97
[58] Field of Search .................. 332/7.51; 356/5, 28.5; 455/608, 609, 600, 611; 372/26, 28, 31, 32, 97, 99

[56] References Cited

U.S. PATENT DOCUMENTS

| | | | |
|---|---|---|---|
| 3,363,248 | 1/1968 | Nicodemus | 343/17.2 |
| 3,549,256 | 12/1970 | Brienza et al. | 356/5 |
| 3,713,042 | 1/1973 | Kinsel | 331/94.5 |
| 3,814,929 | 6/1974 | Whitfield | 455/611 X |
| 3,875,399 | 4/1975 | Teich | 356/28 |
| 3,950,100 | 4/1976 | Keene et al. | 356/28 |
| 3,970,963 | 7/1976 | Chester | 331/94.5 |
| 4,103,255 | 7/1978 | Schlossberg | 331/94.5 |
| 4,190,361 | 2/1980 | Dubrunfaut | 356/5 |
| 4,240,746 | 12/1980 | Courtenay et al. | 356/5 |
| 4,241,319 | 12/1980 | Papayoanou | 331/94.5 |
| 4,284,351 | 8/1981 | Alldritt et al. | 356/28.5 |
| 4,399,564 | 8/1983 | Cowen | 455/611 X |
| 4,429,398 | 1/1984 | Chenausky et al. | 372/64 |
| 4,438,514 | 3/1984 | Chenausky et al. | 372/64 |
| 4,447,149 | 5/1984 | Marcus et al. | 356/5 |
| 4,464,758 | 8/1984 | Chenausky et al. | 372/11 |
| 4,528,525 | 7/1985 | Eden et al. | 332/7.51 |
| 4,528,669 | 7/1985 | Bostick et al. | 372/26 |
| 4,633,478 | 12/1986 | Robusto | 372/83 |
| 4,660,206 | 4/1987 | Halmos et al. | 372/28 |
| 4,666,295 | 5/1987 | Duvall, III et al. | 356/5 |
| 4,719,640 | 1/1988 | Chenausky et al. | 372/97 |

OTHER PUBLICATIONS

Terman, Frederick Emmons; *Radio Engineering;* Third Edition, Third Impression; McGraw-Hill Book Company, Inc.; 1947; pp. 525-527.
Shoemaker, R. L. et al; "Frequency-Switchable $CO_2$ Laser: Design and Performance"; *Applied Optics,* Mar. 1, 1982, vol. 21, No. 5; pp. 961-970.

*Primary Examiner*—Thomas H. Tarcza
*Assistant Examiner*—Linda J. Wallace
*Attorney, Agent, or Firm*—Joseph E. Szabo; Terje Gudmestad; Wanda K. Denson-Low

[57] ABSTRACT

A laser transmitter utilizes optical far field combination of two independent lasers (80,90) and variation of RF exciting power (86) to one (80) to produce sufficient frequency modulation. Two bores (122,124) within the same dielectric body (120) are provided with two independent sets of electrodes (134,135, 138,139) and two independent RF power sources (150,152). The lasers are operated at different frequencies and the beams transmitted in parallel adjacent paths to provide a combined far field optical beam component at the beat frequency of the two lasers. Variation of the frequency of one of the lasers provides frequency modulation of the far field beat frequency, enabling reception and demodulation of the modulated beam without use of a local oscillator laser at the receiver. The transmitter may also be used in a laser radar.

12 Claims, 3 Drawing Sheets

FM LASER TRANSMITTER

BACKGROUND OF THE INVENTION

1. Field of the Invention

The present invention relates to laser transmitters and more particularly concerns a laser transmitter that provides improved modulation of the transmitted beam. The invention is useful in laser transmitters used for communication or in those used as radars.

2. Description of Related Art

Frequency modulation of a laser is employed in several types of radars, such as FM chirp lasers, for example, and is also employed for communication. Various arrangements have been employed for frequency modulation, including the use of a piezoelectric transducer mounting one of the cavity reflectors and energized with a frequency modulating signal. The piezoelectric transducer, however, is expensive and consumes a large amount of power. Further, most piezoelectric tranducers have resonant frequencies, in the 1–20 kHz range, that limit useful maximum frequency and may cause instabilities in optical alignment.

Another form of frequency modulation, one employed for a frequency chirp laser radar, is described in U.S. Pat. No. 4,666,295 to Duvall et al for Linear FM Chirp Laser and in U.S. Pat. No. 4,660,206 to Halmos et al for Chirp Laser Stabilization System, both assigned to the assignee of the present application. In the system described in the Duvall et al patent, an electro-optic modulator crystal is mounted inside the laser cavity and subjected to a high voltage modulating signal which produces rapid switching of laser output frequency. The intra-cavity electro-optic modulator employed for frequency control in this system introduces large cavity losses, and thus reduces laser power by over fifty percent. Moreover, frequency control of the arrangements of both patents is very costly, accounting for as much as one-third of the cost of a laser radar transmitter.

U.S. Pat. No. 4,464,758 refers to a method for implementing phase or AM laser radar in Q-switched laser radar. The standard CW (continuous wave) AM laser radar suffers from range ambiguity. It ranges off the incremental phase difference between the reflected and transmitted beams. It measures all phase difference as being between 0° and 360° C. and cannot distinguish between a target within one AM wavelength from the sensor and a second target, an integral number of AM wavelengths farther away. By comparison, a Q-switched radar can measure the absolute range, but the long (200 ns) pulse limits the range accuracy. U.S. Pat. No. 4,464,758 combines the two techniques, using AM modulation to produce a sharp edge in the center of the Q-switched pulse. The sharp edge can be tracked to the same sort of accuracy as the AM System.

Applicant's system does not require the added complexity of a Q-switched operation and, unlike the device of U.S. Pat. No. 4,464,758, will operate CW. Practical Q-switched operation requires either the same electro-optic modulator used for standard pulsed laser radar (see for example U.S. Pat. No. 4,498,179) or a complicated pressure regulating circuit that the U.S. Pat. No. 4,464,758 does not mention in its passive Q-switched approach.

Acousto-optic devices have been used for frequency modulation, but this scheme too is costly and inefficient. Depending on the acousto-optic drive, efficiency may be less than ten percent at $CO_2$ wavelengths.

For a laser radar system, a pair of lasers in the transmitter is employed, utilizing one laser as a local oscillator with precise frequency control and a second transmitter laser with some means for effecting amplitude or frequency modulation. Where an electro-optic modulation crystal is employed, the transmitter is very costly, because the laser must operate at a carefully controlled carrier frequency to allow heterodyne detection of the received reflected signal. In the acousto-optic format to provide Doppler velocity in radar application, the carefully controlled carrier frequency is also necessary. This precise control of frequency requires an expensive frequency control unit, generally consisting of a piezoelectric crystal, an optical power sensor, and an electronic servo with a high voltage output. The electro-optic and acousto-optic devices an associated electronics are also expensive. The low efficiency modulation of these arrangements often results in unacceptably high power consumption.

Where a laser is used as a transmitter of a communication system, electro-optic frequency modulation of a carbon dioxide $CO_2$ laser may be employed in the transmitter laser to generate the signal. In the receiver a corresponding laser is required as a local oscillator to decode the signal, because frequencies of the transmitted information bearing laser beam are too high for the receiver processing electronics. Thus for FM laser communication systems every receiver must have its own local oscillator laser, resulting in high receiver costs and high power consumption. With a battery operated receiver, required presence of a laser local oscillator exacts a high price in power requirements.

Accordingly, it is an object of the present invention to provide a laser transmitter which avoids or minimizes above-mentioned problems.

SUMMARY OF THE INVENTION

In carrying out principles of the present invention in accordance with a preferred embodiment thereof, a laser transmitter is provided in which first and second lasers are caused to generate first and second laser beams of mutually different nominal frequencies. The two beams are transmitted in parallel, closely adjacent paths to provide a combined far field beam pattern having a frequency (e.g. beat frequency) corresponding to the difference between the nominal frequencies of the two lasers. The beat frequency is considerably lower than the frequency of either laser beam. This beat frequency effectively appears as an amplitude modulation envelope, at the beat frequency, of one of the transmitted laser beams. The frequency of one of the beams is modulated so as to modulate the frequency of the far field combined beam, enabling detection in a receiver without use of any local oscillator laser. For use in radar, a system according to the invention provides a much simplified transmitter, which effectively transmits and receives an optical beam amplitude modulated at a radio frequency. Frequency of the amplitude modulation is readily varied. As a communication system the invention effectively provides for transmission of an amplitude modulated laser beam bearing information in the form of frequency variation of its radio frequency amplitude envelope.

According to another feature of the invention, for use in both communication and radar transmitters, frequency modulation of one of the two lasers in the transmitter is accomplished by modulation of the amplitude of the radio frequency exciting signal that is applied to the lasing medium within the laser cavity. The two laser beams are generated with a nominal frequency difference that is in the radio frequency band, and thus reception and demodulation may be achieved by employing known radio frequency components and techniques.

DESCRIPTION OF THE PREFERRED EMBODIMENT

Figure 1:
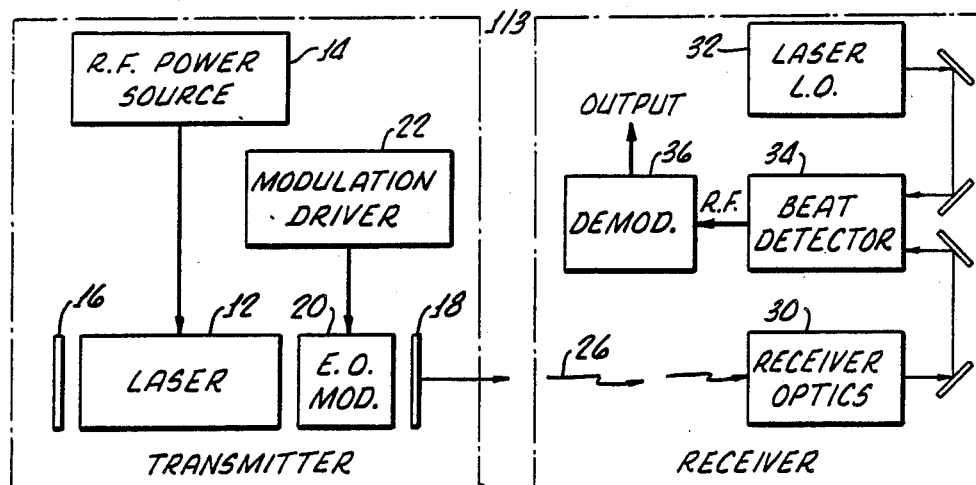
FIG. 1 illustrates a simplified exemplary prior art FM laser communication system.

FIG. 1 is a simplified showing of a prior art laser communication system in which a transmitter 10 includes laser 12 excited by a radio frequency signal from a radio frequency power source 14 to effect laser energy oscillations in the laser cavity between a total end reflector 16 and a partially transmissive and partially reflective output reflector 18. Mounted within the cavity between the end reflectors 16 and 18 is an electro-optic modulator 20, energized by a modulation driver 22. A frequency modulated beam, indicated at 26, is transmitted from the laser and received by a remote receiver 28. The receiver includes receiver optics 30 and a local oscillator laser 32. The received modulated optical signal is heterodyned with the local oscillator optical signal from laser 32 in a beat detector 34 of which the output is fed to a demodulator 36 to provide the information signal for further processing, as required. Because the receiver demodulator cannot handle a signal at optical frequencies, the receiver must have the laser local oscillator to heterodyne with the received optical signal to obtain a signal at RF frequencies for the demodulator. As previously mentioned, the laser local oscillator is expensive and has high power consumption.

Figure 2:
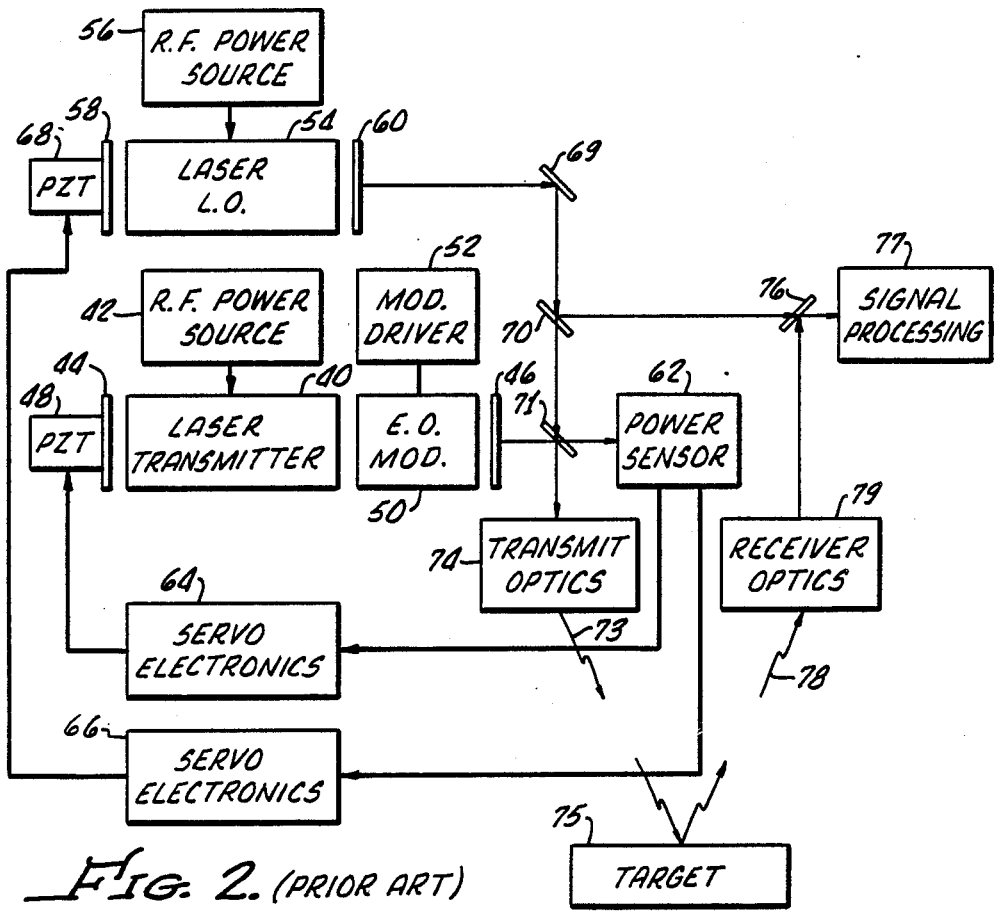
FIG. 2 illustrates a simplified FM laser radar of the prior art.

FIG. 2 is a simplified showing of a radar system that is exemplary of certain prior art radar systems (such as that shown in Duvall et al U.S. Pat. No. 4,666,295) in which a carbon dioxide ($CO_2$) laser 40 is electrically pumped or excited by a source of radio frequency power 42 to provide laser oscillations within a laser cavity defined between a rear cavity mirror 44 and a forward cavity output mirror 46. Rear mirror 44 is mounted upon a piezoelectric crystal 48, and an electro-optic crystal modulator 50 is positioned within the laser cavity adjacent the output mirror 46. A modulating voltage applied to the crystal modulator from a modulator driver 52 changes its index of refraction, thereby changing optical path length of the laser resonating cavity and shifting laser frequency. A local oscillator laser 54 is also provided, being energized by a radio frequency power source 56 to produce energy oscillations within the laser cavity defined between a rear cavity mirror 58 and a forward cavity output mirror 60.

A radar system requires stabilized oscillation frequencies. Thus both the local oscillator and the modulated laser are frequency stabilized by a power sensor 62 feeding a signal representing sensed power to a feedback circuit including servo electronics 64 and 66 to control piezoelectric crystal 48, which mounts the rear reflector 44 of laser 40, and to control a second piezoelectric crystal 68, which mounts the rear reflector 58 of the local oscillator. The local oscillator output beam is fed to the power sensor by reflection from a reflector 69 and thence a small portion of the beam is fed through a first beam splitter 70 to be reflected by a second beam splitter 71 to the power sensor 62. A small portion of the beam of the modulated laser transmitter 40 is fed through the beam splitter 71 to the power sensor. The major portion of the power of the transmitter beam is reflected from the beam splitter 71 and fed through transmitter optics 74 for transmission as a beam 73 toward a target 75. The local oscillator beam is reflected from beam splitter 70 and passed through a third beam splitter 76 to a signal processing circuit 77, which also receives a signal 78 reflected from the target, received by receiver optics 79 and reflected by beam splitter 76 to the processing circuit where it is heterodyned with the local oscillator signal.

The radar system illustrated in FIG. 2 has problems due to use of both the piezoelectric crystal for stabilizing frequency and the intra-cavity crystal modulator. The piezoelectric crystal exhibits unwanted mechanical resonances, and requires costly high voltage electronics. The electro-optic modulator also introduces a number of problems, including large intra-cavity losses, thereby drastically reducing laser output power, and causes beam distortion due to non-linear thermal variations in the crystal. Problems of this system also include the high cost and difficult manufacturing techniques for the crystal and the expensive, high voltage, high frequency driving electronics required.

In a co-pending application of Charles H. Wissman and Michael T. Braski, for Laser Frequency Control, Ser. No. 220,632, filed July 18, 1988, and assigned to the assignee of the present application, there is described a laser frequency modulation technique that avoids many of the problems of prior art frequency modulation. The disclosure of this application of Wissman and Braski is hereby incorporated by this reference as though fully set forth herein. In the system disclosed in this companion application, frequency modulation and/or frequency stabilization is carried out in a radio frequency excited $CO_2$ laser by varying amplitude of the exciting signal provided to the laser by the RF exciting power source. Variation of amplitude of the RF exciting signal is disclosed in the co-pending application of Wissman and Braski to provide a shift in laser frequency (FM modulation) that may be used either for frequency modulation or for frequency stabilization, or both.

According to one aspect of the present invention, this frequency modulation technique of the Wissman and Braski application is employed to provide an improved, simplified and inexpensive FM laser transmitter. This technique readily allows transmission of two closely adjacent side by side, parallel laser beams having a frequency difference in the order of radio frequencies. Moreover the FM modulation technique of Wissman and Braski enables improved FM modulation of one of the two transmitted beams. The two beams combine, or heterodyne, outside of the laser cavities, beyond the output optics of the lasers, to provide a combined far field beam pattern at the beat frequency, that is, at the frequency of the difference between frequencies of the two laser beams. This difference frequency is chosen to be in the order of a radio frequency, and thus a receiver need handle only a received signal of radio frequency. The radio frequency signal may be demodulated by known radio frequency demodulating components, and the receiver need not have its own local oscillator laser.

Figure 3:
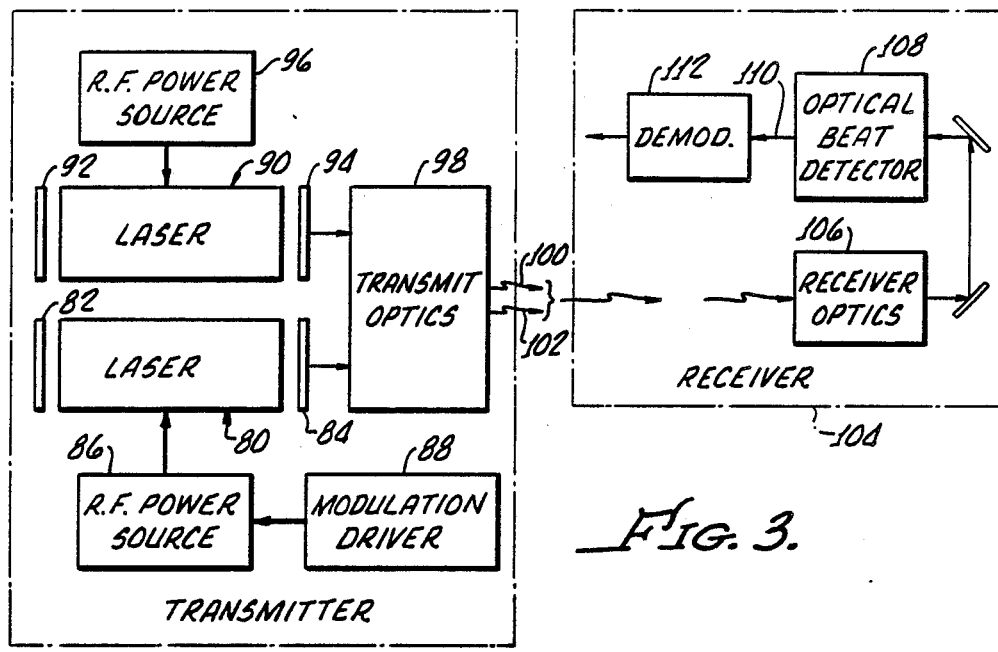
FIG. 3 schematically illustrates a communication system employing principles of the present invention.

FIG. 3, which shows a laser communication transmitter and remote receiver embodying principles of the present invention, illustrates the transmitter with two separate lasers, whereas the receiver has none. In a presently preferred embodiment the two lasers are formed as separate bores in a single ceramic block, as will be more particularly explained in connection with FIGS. 4 and 5. A first laser 80 includes a cavity defined in a laser body and having end reflectors 82,84, providing laser energy oscillations within the gaseous medium of the cavity when excited by an RF signal from a radio frequency exciting power source 86. Power applied by the RF power source 86 is varied by a frequency modulation driver 88 to thereby vary frequency of the laser energy oscillations within the cavity of laser 80. A second laser 90, also having a cavity with end reflectors 92,94, and confining a gaseous medium excited by a radio frequency signal from an RF power source 96, is positioned close to the laser transmitter.

Laser energy beams transmitted from the output reflectors 84,94 of the two lasers are transmitted through transmit optics 98 as two mutually parallel, closely adjacent but separate beams 100,102. Preferably the lasers provide lasing oscillations at mutually different frequencies, with a frequency difference that is a radio frequency, in the range of about 10 KHz to 150 MHz. The lasing medium is a conventional carbon dioxide gas mixture, and, in a particular embodiment presented here as an example only, each laser cavity may have a width and height of about 0.080 inches by 0.080 inches, and a length of 7.75 inches. With RF excitation frequency at 74.5 MHz, nominal input power is 50 watts, and nominal output power is 2.5 watts. Nominal lasing wavelength is 10.6 micrometers. The two lasers are made to be substantially identical, having all of the same parameters, dimensions, lasing medium composition, pressure and the like. The two lasers may be made to share the same optics and have the same cavity length so as to have the same nominal lasing frequency for the same input power.

By suitable means, such as effecting controlled relative variation of output RF power of the two separate power sources 86,96 of the lasers, the two cavities are made to oscillate at different frequencies. Obviously other techniques may be used to establish the two lasers at the desired nominal frequencies. Variation of RF exciting power amplitude to achieve control of lasing frequency is described more particularly in the above-identified co-pending application of Wissman and Braski for Laser Frequency Control.

The two transmitted beams combine to provide an optical beam component or an optical beat frequency component that is formed by beating or heterodyne action that is basically the same action that occurs in the well known heterodyning of radio frequency signals. Such basic heterodyning action is described, for example, in pages 525 through 527 of Radio Engineering by F. E. Terrman, Third Edition, 1947. In heterodyning action, two waves of different frequencies combine to effectively impose upon one of the waves a varying amplitude modulation envelope that varies between successive amplitude peaks at a frequency that is the difference between frequencies of the two waves involved. In other words, the beating of the two transmitted laser beams, which expand and mutually overlap as they propagate, effectively imposes on one of the laser beams a fluctuating amplitude envelope having a radio frequency. Receiver components that cannot handle the high frequency of the laser beam carrier of this amplitude envelope, can readily receive and demodulate the amplitude envelope of the laser beam. No laser local oscillator is needed.

By varying frequency of one of the two transmitted laser beams with an information signal, the beat frequency of the amplitude envelope is varied so that the beat frequency is frequency modulated by the information signal.

Accordingly, with a controlled nominal frequency difference between frequencies of the two transmitted beams 100 and 102 in the range of from 10 KHz to 150 MHz, the two closely adjacent beams produce a far field pattern which exhibits an optical beam component (amplitude envelope) at the beat frequency. Thus the combined beams in the far field, at a distance from the transmit optics, effectively produce an optical component having a frequency equal to the frequency difference between the two transmitted beams. This difference, of course, is far lower than the frequency of either laser beam. Although the nominal frequencies of both lasers are set to provide the described frequency difference, laser 80 has the amplitude of the output of its RF power source 86 modulated by an information source which includes a frequency modulation driver 88. Thus, the information to be transmitted is impressed upon the RF power, or, more specifically, impressed upon the RF exciting signal from power source 86 in the form of amplitude modulation of the exciting signal. This amplitude modulation imposes a frequency modulation upon the energy oscillations within the cavity of laser 80, and thus the beam 102 transmitted by laser 80 is frequency modulated with the desired information signal. Accordingly the beat frequency is also modulated by this information signal, and the far field pattern of the combined transmission exhibits a optical beam at the modulated beat frequency of the two lasers. Stated otherwise, the amplitude envelope of one of the transmitted laser beams is frequency modulated by the information to be transmitted.

A remote receiver, generally indicated at 104, employs receiver optics 106 for receiving the transmitted heterodyned beams and feeds this optical signal to an optical signal detector 108. Detector 108 detects the frequency modulated amplitude envelope (having a radio frequency) and in turn provides as its output a radio frequency signal on a line 110 which is fed to a substantially conventional radio frequency FM demodulator 112. Further processing (not shown) of the signal from demodulator 112 is conventional. Note that the receiver, although it receives an optical signal, needs no local laser oscillator, because the received signal is at the beat frequency, which is in the band of radio frequencies.

The described communication system, as illustrated in FIGS. 3, employs two lasers in the transmitter, but its beam may be received and utilized by a receiver that does not have a laser. This transmission system is secure and covert. It has a major advantage of transmitting a narrow beam width information bearing signal that is much more difficult to detect with non-target receivers because of its narrow footprint. For example, the beam of such a dual laser transmitter will have a footprint or beam width in the order of 1 meter at a distance of 1 kilometer from the transmitter, whereas a radio frequency transmitter transmitting a beam at a 6 meter wavelength will have a footprint of as much as 200 feet at one kilometer. Moreover, the beam of a carbon dioxide laser is more difficult to detect than the conventional radio frequency signal, thus further enhancing the increased security afforded by the described transmitter.

Figure 4:
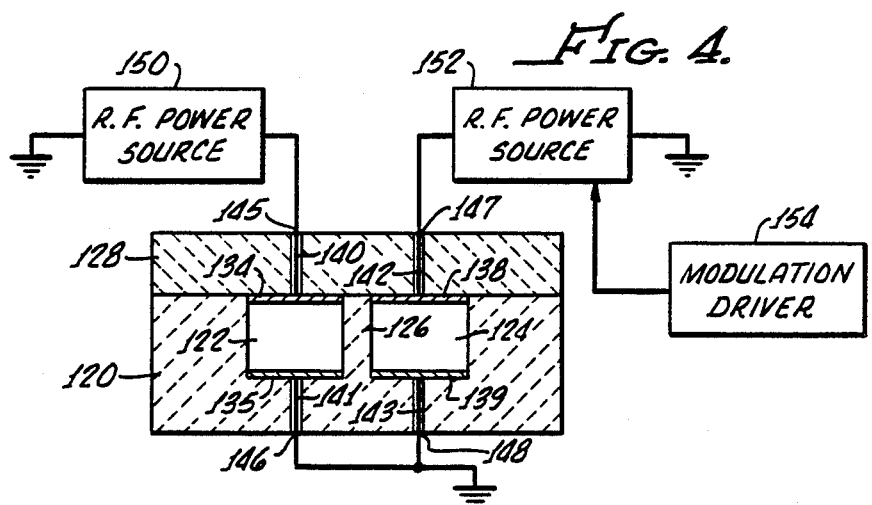
FIG. 4 illustrates a dual cavity waveguide laser transmitter of the present invention in cross section.
Figure 5:
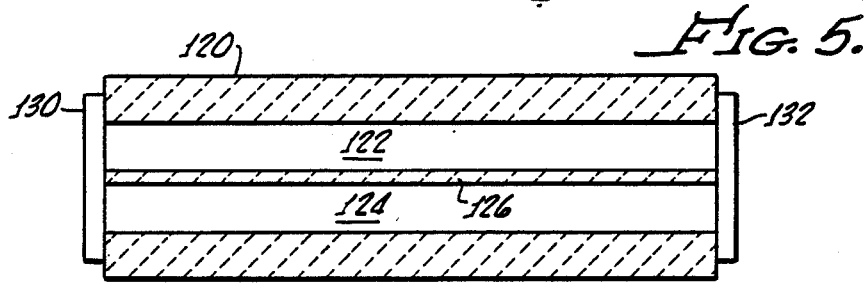
FIG. 5 is a longitudinal sectional view of the side by side laser cavities of FIG. 4.

A presently preferred arrangement for a transmitter having two closely adjacent, substantially identical lasers with separate and separately controlled RF power sources is illustrated in FIGS. 4 and 5. As shown in FIG. 4, a ceramic block 120 is formed with a pair of elongated cavities 122,124 separated by a narrow partition 126. The cavities are formed as grooves in the block 120 which are closed by a cap block 128, which is secured and sealed to block 120. End reflectors 130,132, the latter being an output reflector that is partially transmissive, are provided in common to the two closely adjacent cavities so that the reflectors may be properly aligned to provide for equal cavity lengths of the two cavities. Exciting electrode pairs 134,135 and 138,139 are formed by a metallic coating on upper and lower surfaces of the cavities 122 and 124 respectively. Connecting leads extend to outer surfaces of the cavity block from the respective electrodes through sealing apertures 140,141,142, and 143, which extend through the ceramic block material to outer terminal points 145,146,147 and 148. The terminals 145, 146 are connected to a first RF power source 150, and terminals 147, 148 are connected to a second RF power source 152. The latter has the amplitude of its RF exciting signal modulated by a frequency modulator driver 154, which provides the information signal that is frequency modulated upon the laser of cavity 124. Except for different exciting power levels, the two lasers are substantially identical to each other, having the same parameters as lasers 80 and 90. The nominal power levels or amplitudes of power sources 150 and 152 are controlled so as to provide for the desired nominal frequency difference (as described above in connection with FIG. 3) between the frequencies of the two lasers in the respective cavities 122, 124. The dual waveguide laser system illustrated in FIGS. 4 and 5 may be fabricated in a manner similar to that disclosed in U.S. Pat. No. 4,751,715 of Alan R. Henderson, for Clustered Waveguide Laser, assigned to the assignee of the present application. The disclosure of this patent of Henderson is incorporated herein by this reference as though fully set forth.

With the construction illustrated in FIGS. 4 and 5, the two lasers may be positioned close together, providing a compact package and enabling the use of smaller common optics and better control of relative frequencies. The common optics helps to maintain the nominal frequency difference in the two laser bores. Basically the arrangement of FIGS. 4 and 5 shows two substantially independent and separate lasers which are mounted in a compact arrangement that provides ready control of the relative frequencies and simplified transmission of the two laser beams along parallel, closely adjacent paths.

The communication system transmitters illustrated in FIG. 3 and in FIGS. 4 and 5 alternatively may be employed for a simplified, inexpensive laser radar, which eliminates the need for expensive, low efficiency electro-optic modulators and acoustic modulators, and, moreover, provides for simpler, less costly receiving circuitry. Such a radar will operate CW (continuous wave) and does not require added complexity of a Q-switched operation, as in U.S. Pat. No. 4,464,758, mentioned above.

Figure 6:
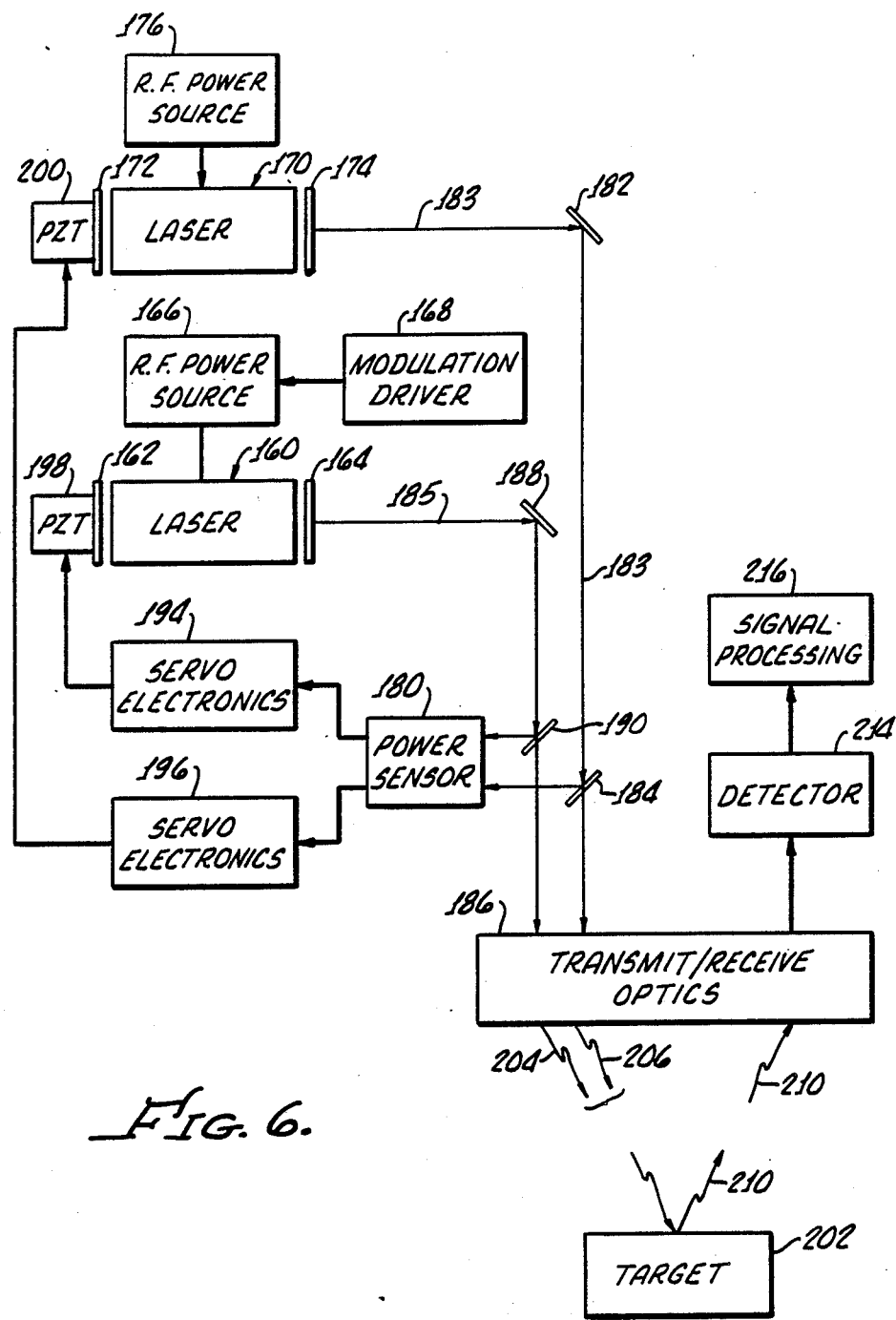
FIG. 6 schematically illustrates an FM laser radar system employing principles of the present invention.

Thus, as illustrated in FIG. 6, a first laser 160, having end reflectors 162,164 is energized by a radio frequency exciting signal from an RF power source 166. A modulator driver 168 varies the amplitude of the RF exciting signal from power source 166, thereby varying the frequency of the laser energy beam provided from the transmitting end reflector 164. A second laser 170, having end reflectors 172,174, is energized with an RF exciting signal from an RF power source 176. Beam 183 of laser 170 is reflected by a reflector 182, thence transmitted through a beam splitter 184 to transmit/receive optics 186. A small portion of the beam 183 of the laser 170 is reflected by the beam splitter 184 to a power sensor 180. Similarly, the beam 185 from laser 160 is reflected by a reflector 188, and thence fed through a beam splitter 190 to transmit/receive optics 186. Beam splitter 190 reflects a small portion of the beam 185 from laser 160 to the power sensor 180. The power sensor provides separate feedback signals to servo electronics 194,196, respectively, which provide feedback stabilizing signals to piezoelectric transducers 198,200, respectively, upon which are mounted the rear reflectors 162,172.

The feedback stabilization loops operate in a substantially known manner to maintain a nominal frequency of the lasers should they tend to drift due to thermal variations and the like. Such feedback stabilization arrangements are shown in detail in the above mentioned U.S. Pat. Nos. 4,666,295 and 4,660,206. Although separate servo electronics 194,196 are shown, it will be understood that the two lasers may have their piezoelectric transducers operated from a single combined servo electronic circuit. It is also contemplated that instead of employing the piezoelectric transducers in the feedback stabilization loops, the servo electronic feedback signal will be applied to the radio frequency power sources to provide the laser frequency stabilization as more particularly described in the above-identified co-pending companion application for Laser Frequency Control of Charles H. Wissman and Michael T. Braski. If the radar is used to measure Doppler velocity, frequency control is important. But in AM, range, or certain pulsed arrangements, frequency control is not nearly as important. The type of transmitter described herein is best suited for AM/ranging applications, such as wire detection/collision avoidance, where the laser puts out a pulse train that is used to detect telephone or electric wires within a few hundred feet of the plane or helicopter. The transmitter described herein, although not as sophisticated as the scheme of the above mentioned U.S. Pat. No. 4,666,295 to Duvall et al will provide an acceptable alternative to the Duvall et al performance, where lower cost is an important factor.

Just as in the transmitter of FIG. 3, the optics 186 transmits first and second laser beams 204,206 along closely adjacent parallel paths to provide a far field combined beam at the beat frequency of the two. As described in connection with the laser transmitter of FIG. 3, the nominal frequencies of the two lasers 160 and 170 are maintained at a difference that is a radio frequency, in the order of about 10 KHz to 150 MHz. Thus the system effectively transmits an optical beam having an amplitude envelope at the beat frequency, a radio frequency, which frequency may be caused to vary in a desired manner by control of the modulation driver 168. The receiver portion of the radar system illustrated in FIG. 6 receives the reflection (from a target 202) of the optical signal at the beat frequency, indicated by reflected beam 210 in FIG. 6. The radar transmit/receive optics 186 (used in common for both transmission and reception) passe this radio frequency optical beam to a detector 214 which provides a radio frequency electrical signal representing the reflected signal to a signal processing circuit 216 for suitable processing and information extraction.

In the radar of FIG. 6 beat frequency may be varied by the modulation driver 168 in one of several different modes. The described laser transmitter can be used either as one for replacement for an AM laser radar transmitter or as a transmitter for pulse tone or Fourier transform radar. Essentially, one could (1) fix the beat frequency and use the phase of the detected RF (beat frequency) return; (2) sweep the beat frequency to eliminate range ambiguities but otherwise detect the phase of the RF return as in the AM case; or (3) step the beat frequency, take a complete scan or picture after each step, then Fourier transform to obtain a range picture.

Effectively, the radar system illustrated in FIG. 6 is an RF type radar having a carbon dioxide laser generated beam. This is so because the far field combination of the two beams effectively provides an optical signal at an RF frequency.

The radar described herein can also be used in the same way as the FM chirp lasers of the prior art, such as shown in U.S. Pat. No. 4,666,295, by providing step frequency shift of the RF exciting signal.

What is claimed is:

1. A method of transmitting a modulated optical beam comprising the steps of:
   providing a laser medium in first and second closely adjacent laser cavities;
   applying excitation energy to the first and second laser cavities to generate energy oscillations in the laser cavities at first and second nominal frequencies;
   frequency modulating the first beam by varying the magnitude of the excitation energy applied to the first laser cavity to thereby vary the frequency of energy oscillation therein; and
   transmitting the modulated first beam and the second beam along respective adjacent parallel paths, whereby the transmitted beams combine to provide a combined beam having a frequency at the beat frequency of the combined beams, the beat frequency varying with the frequency modulation of the first beam.

2. The method of claim 1 wherein said step of generating comprises generating said beams of laser light at first and second frequencies, respectively, said first and second frequencies being displaced from one another by an amount corresponding to a radio frequency.

3. A method of optical communication comprising transmitting a modulated optical beam according to the method of claim 1, said step of frequency modulating comprising varying the frequency of said first beam in accordance with information to be communicated, detecting said combined beam to provide a radio frequency electrical signal, and demodulating said radio frequency electrical signal.

4. A method of obtaining information concerning a target comprising transmitting toward the target a modulated optical beam according to the method of claim 1, and receiving a reflection from the target of said combined beam.

5. The method of claim 1 wherein said step of applying exciting energy comprises providing first and second pairs of exciting electrodes for said first and second cavities, respectively, and feeding first and second separate exciting signals to respective pairs of electrodes.

6. The method of claim 5 wherein said step of frequency modulating comprises varying the amplitude of one of said exciting signals.

7. An optical system comprising:
   first and second lasers having first and second mutually displaced frequencies, said first and second lasers comprising a body of dielectric material having first and second closely adjacent bores, a lasing medium in said bores, first and second cavity reflectors at opposite ends of said bores, each of said reflectors being common to both of said bores, said reflectors being positioned and aligned to cause the first and second cavities to have substantially the same length, first and second sets of electrodes coupled to said first and second cavities respectively, radio frequency power supply means for generating first and second radio frequency excitation signals;
   means for modulating the frequency of said first laser to provide a frequency modulated light beam, which comprises modulator means for generating a modulating signal, means for feeding said modulating signal to said power supply means to vary the amplitude of said first excitation signal in accordance with said modulating signal, means for feeding said first excitation signal to the first set of electrodes to thereby frequency modulate the light beam projected from said first laser, and means for feeding said second excitation signal to the second set of electrodes to cause the beam of said second laser to have a frequency that differs from the nominal frequency of the beam of said first laser by an amount corresponding to a radio frequency;
   means for transmitting said frequency modulated light beam from said first laser along a first path; and
   means for transmitting a light beam of said nominal frequency from said second laser along a second path substantially parallel to and closely adjacent said first path, whereby said projected beams combine to provide a far field transmitted pattern which includes a beam component at a beat frequency of said transmitted beams, said beat frequency varying with variation of the frequency of said frequency modulated light beam.

8. The system of claim 7 including a receiver having optical means for receiving said beam component to provide a frequency modulated radio frequency signal at said beat frequency, said receiver having means for demodulating the modulated radio frequency signal.

9. A secure communication system comprising a transmitter, said transmitter comprising an optical system according to any one of claim 7, and wherein said means for modulating frequency comprises means for varying frequency of said first laser in accordance with information to be transmitted.

10. A radar system comprising an optical system according to claim 7 including means for receiving a reflection of said beam component from a target.

11. A modulated laser transmitter comprising:

first and second laser means for generating first and second laser beams of mutually different nominal frequencies, each of the laser means including a laser cavity having lasing medium confined therein and radio frequency power source means for exciting the medium with a radio frequency exciting signal to generate energy oscillations in the laser cavity;

means for modulating the frequency of the first laser beam comprising means for varying the amplitude of the radio frequency exciting signal of one of the radio frequency power source means in accordance with information to be transmitted; and means for transmitting said beams in substantially parallel, closely adjacent paths to provide a combined far field beam having a frequency corresponding to the difference between said nominal frequencies.

12. The transmitter of claim 11 wherein said power source means comprises, for each laser, a pair of exciting electrodes and an RF power source coupled with the electrodes to provide separate and separately controllable RF exciting signals to the respective cavities.

* * * * *